(12) United States Patent
Akhtar

(10) Patent No.: US 10,728,336 B2
(45) Date of Patent: Jul. 28, 2020

(54) INTEGRATED IOT (INTERNET OF THINGS) SYSTEM SOLUTION FOR SMART AGRICULTURE MANAGEMENT

(71) Applicant: Sabrina Akhtar, San Diego, CA (US)

(72) Inventor: Sabrina Akhtar, San Diego, CA (US)

(73) Assignee: Sabrina Akhtar, Palo Alto, CA (US)

( * ) Notice: Subject to any disclaimer, the term of this patent is extended or adjusted under 35 U.S.C. 154(b) by 336 days.

(21) Appl. No.: 15/451,420

(22) Filed: Mar. 7, 2017

(65) Prior Publication Data

US 2018/0262571 A1 Sep. 13, 2018

Related U.S. Application Data

(60) Provisional application No. 62/304,017, filed on Mar. 4, 2016.

(51) Int. Cl.
*H04W 4/38* (2018.01)
*H04L 29/08* (2006.01)
(Continued)

(52) U.S. Cl.
CPC .............. *H04L 67/12* (2013.01); *A01G 25/16* (2013.01); *G05B 13/0275* (2013.01); *G06Q 10/06313* (2013.01); *G06Q 10/087* (2013.01); *G06Q 30/0202* (2013.01); *G06Q 50/01* (2013.01); *G06Q 50/28* (2013.01); *H04L 67/025* (2013.01);
(Continued)

(58) Field of Classification Search
CPC ....... H04L 67/12; H04L 67/025; A01G 25/16; B64D 47/08; H04M 1/72561; G05B 13/0275; G06Q 30/0202; G06Q 50/01; G06Q 10/06313; G06Q 50/28; G06Q 10/087; G06F 16/29; Y02P 30/10; B64C 2201/127; B64C 2201/146; B64C 31/06; B64C 39/024; H04W 84/18; H04W 4/70; H04W 4/38; H04W 4/02
See application file for complete search history.

(56) References Cited

U.S. PATENT DOCUMENTS

| | | | |
|---|---|---|---|
| 7,667,604 B2 * | 2/2010 | Ebert | ..................... G06K 17/00 340/572.4 |
| 9,418,263 B2 * | 8/2016 | Butler | ................. H04L 67/1097 |

(Continued)

*Primary Examiner* — Michael C Zarroli

(57) ABSTRACT

An end to end integrated technology solution available to increase overall crop yield and a communication platform to connect growers with the marketplace and an infrastructure for agriculture management, logistics, storage, distribution and delivery. Offering a global solution to this problem that provides a consolidated and integrated IoT (Internet of Things) system where data collection, monitoring, control and communication platform are managed using a single platform. An agricultural IoT monitoring device based on wireless mesh network sensing, where this device can monitor the temperature, humidity, vibration and other parameters of an agricultural cultivation base. The device is designed with a microcontroller, a sensing unit, WiFi module, LoRa communication network where it uses WiFi Mesh Network or LoRaWAN to capture real-time data for remote viewing and analyzing intelligence data for preventive actions. This single IoT system platform is providing solution for agriculture and various applications.

13 Claims, 4 Drawing Sheets

Sample measurement reading from the sensors

| Parameters | Measurement (avg) |
|---|---|
| Soil Moisture | 32% |
| Soil Temperature | 53deg F |
| Soil pH | 7.5 |
| Soil Nitrogen | 60mgN/Kg soil |
| Soil Salinity | 0.2ms/cm |
| Leaf wetness duration (LWD) | 1.6h |
| Air temperature | 67 deg F |
| Air humidity | 48% |
| Rainfall | 15.75 inches |
| Wind speed | 7miles/hour |
| Wind direction | north to south |
| Illumination | 8hrs |
| Field Images | various loc of the field |

(51) Int. Cl.
  *G05B 13/02* (2006.01)
  *G06Q 10/06* (2012.01)
  *H04W 4/02* (2018.01)
  *G06Q 10/08* (2012.01)
  *G06Q 50/28* (2012.01)
  *G06Q 50/00* (2012.01)
  *G06Q 30/02* (2012.01)
  *H04W 4/70* (2018.01)
  *A01G 25/16* (2006.01)
  *H04W 84/18* (2009.01)
  *G06F 16/29* (2019.01)

(52) U.S. Cl.
  CPC .............. *H04W 4/02* (2013.01); *H04W 4/38* (2018.02); *H04W 4/70* (2018.02); *B64C 2201/12* (2013.01); *B64C 2201/123* (2013.01); *G06F 16/29* (2019.01); *H04W 84/18* (2013.01); *Y02P 30/10* (2015.11)

(56) References Cited

U.S. PATENT DOCUMENTS

| | | | |
|---|---|---|---|
| 9,519,861 B1* | 12/2016 | Gates | G06N 5/02 |
| 10,084,868 B2* | 9/2018 | Chandra | H04L 12/66 |
| 10,091,276 B2* | 10/2018 | Bloomquist | G06F 9/5061 |
| 10,115,158 B2* | 10/2018 | Lindores | A01B 79/005 |
| 2016/0078569 A1* | 3/2016 | Ethington | G06Q 10/06375 |
| | | | 705/7.37 |
| 2017/0053293 A1* | 2/2017 | Choi | H04L 67/02 |
| 2018/0132307 A1* | 5/2018 | Almeida Neves | H04W 84/005 |
| 2018/0204292 A1* | 7/2018 | Akadiri | G06Q 10/06 |
| 2018/0284753 A1* | 10/2018 | Cella | G05B 23/024 |
| 2018/0316416 A1* | 11/2018 | Reis | H04B 7/18513 |

* cited by examiner

Figure 1: FLOWCHART FOR COLLECTING FIELD DATA
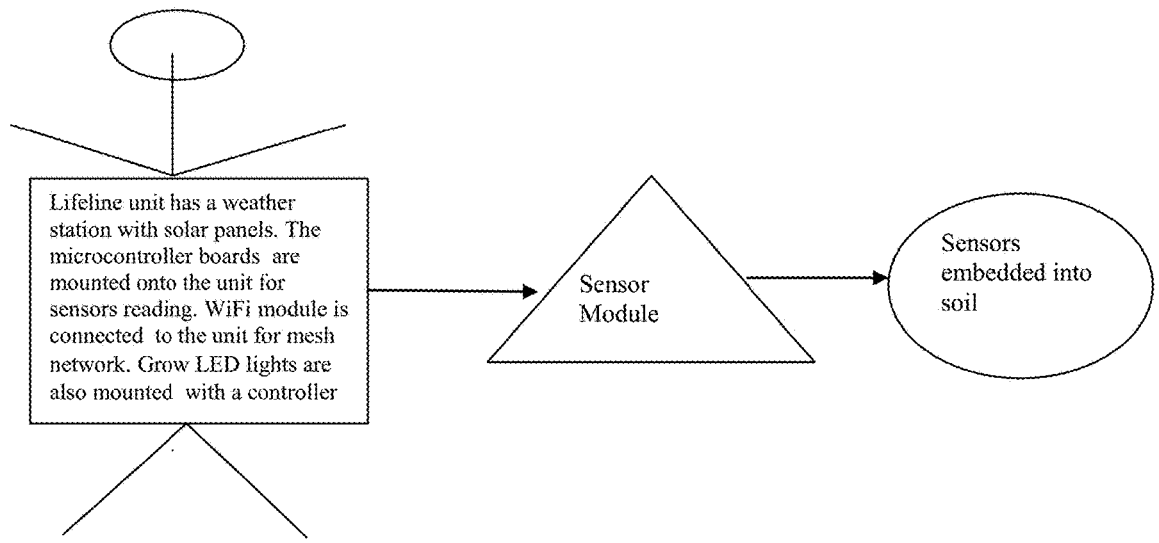
Drip and Spray Irrigation System with Micro controller in the field
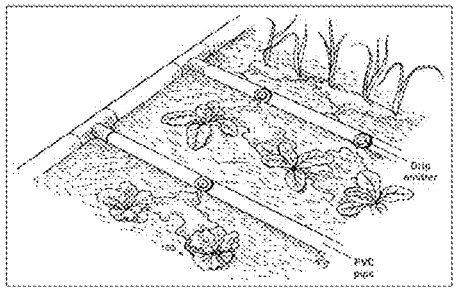
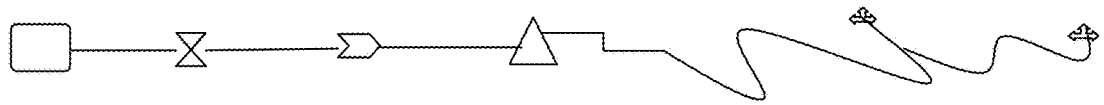

Figure 2:   Monitoring Field Data

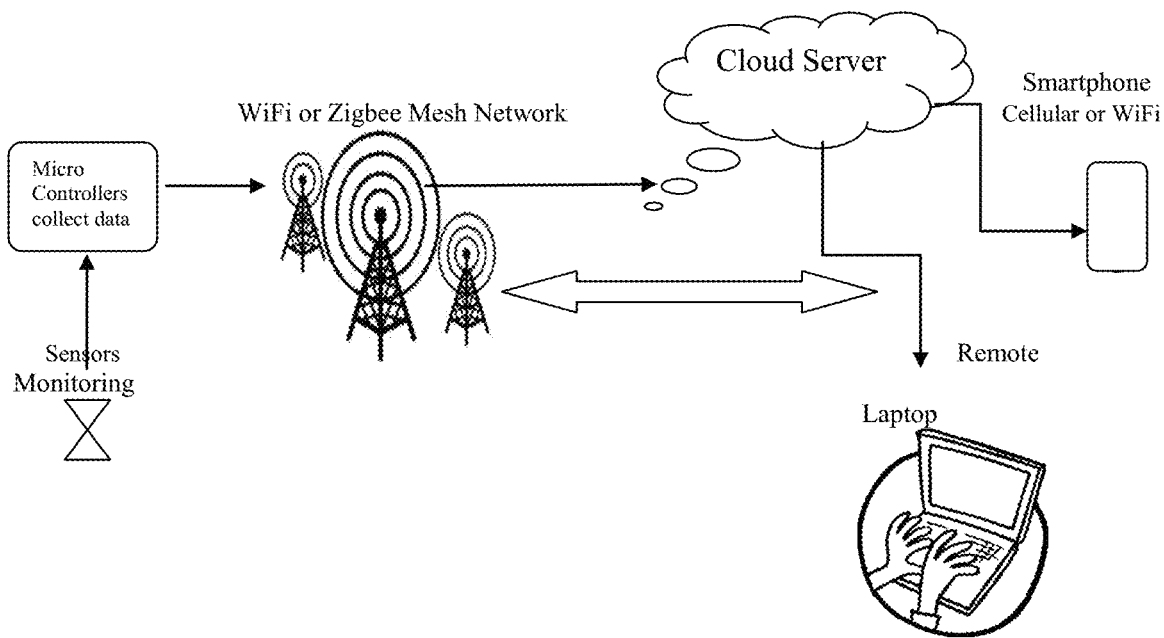

Sample measurement reading from the sensors

| Parameters | Measurement (avg) |
|---|---|
| Soil Moisture | 32% |
| Soil Temperature | 53deg F |
| Soil pH | 7.5 |
| Soil Nitrogen | 60mgN/Kg soil |
| Soil Salinity | 0.2ms/cm |
| Leaf wetness duration (LWD) | 1.6h |
| Air temperature | 67 deg F |
| Air humidity | 48% |
| Rainfall | 15.75 inches |
| Wind speed | 7miles/hour |
| Wind direction | north to south |
| Illumination | 8hrs |
| Field Images | various loc of the field |

Figure 3: Control System overview
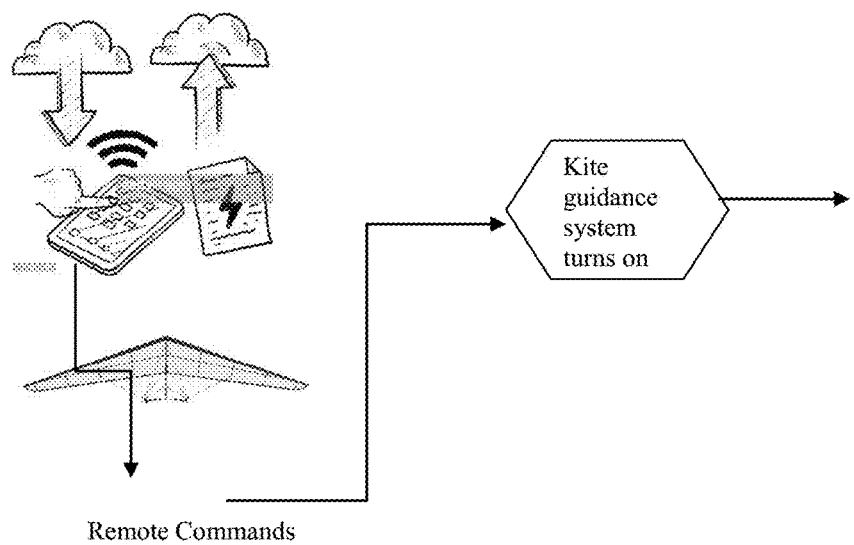
Remote Commands
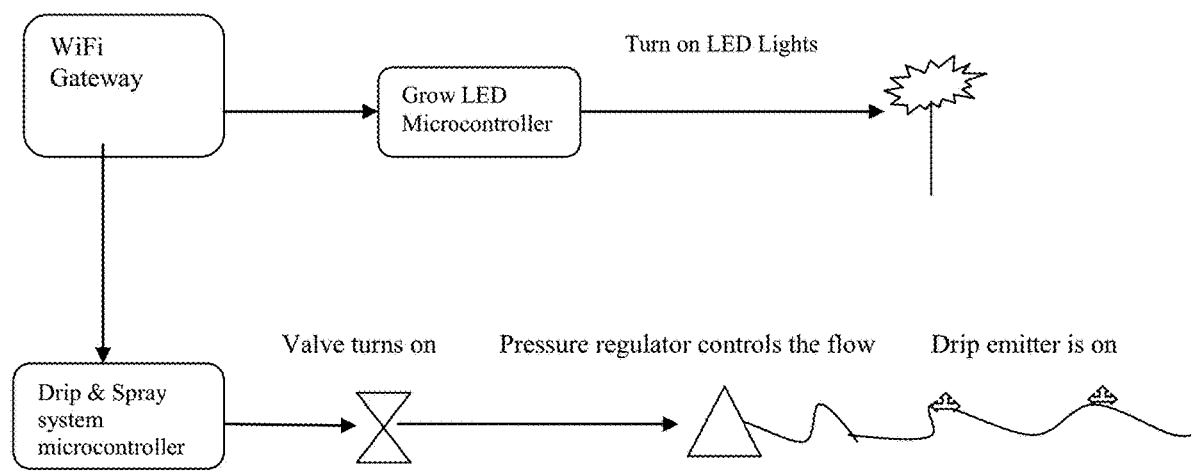

Figure 4: Communication Systems Overview
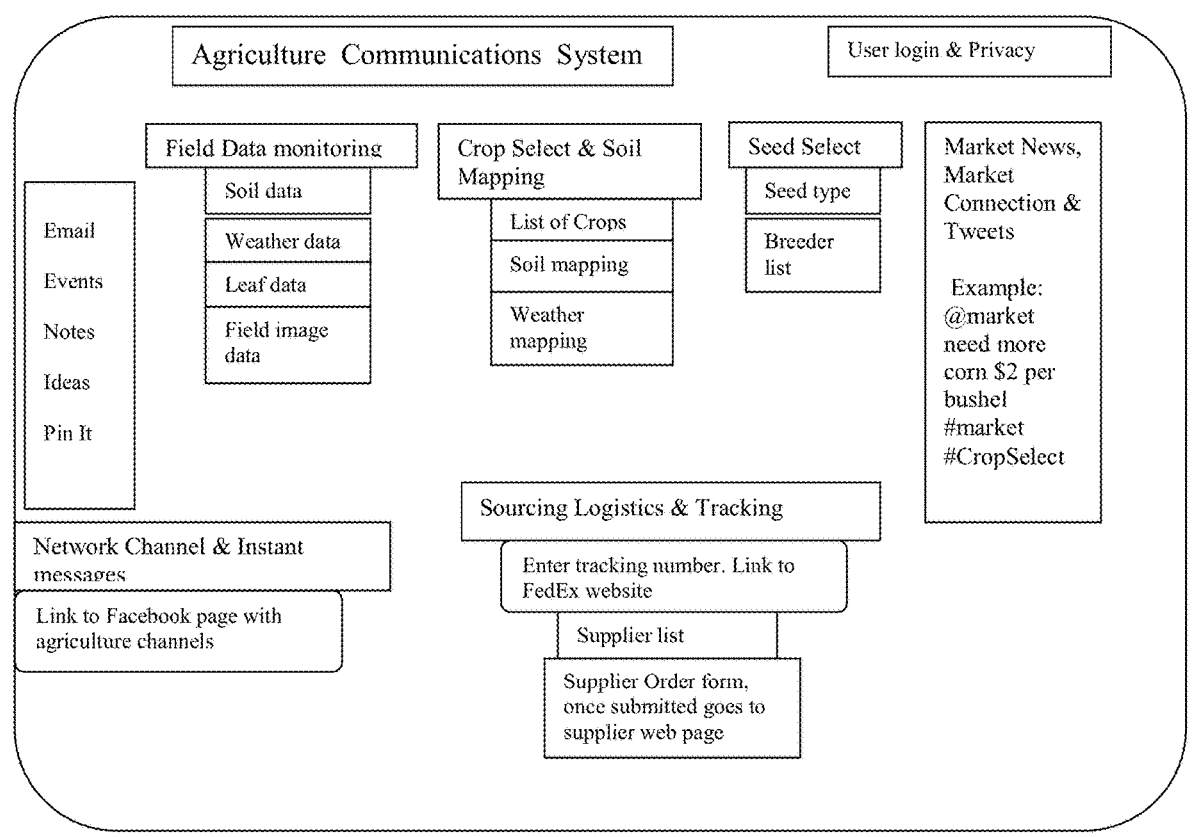

INTEGRATED IOT (INTERNET OF THINGS) SYSTEM SOLUTION FOR SMART AGRICULTURE MANAGEMENT

BACKGROUND OF THE INVENTION

The present invention is directed to an integrated IoT (Internet of Things) system for Smart Agriculture management increasing crop yield, optimize food storage, distribution and delivery using IoT and Artificial Intelligence in its communication and supply chain infrastructure

DESCRIPTION OF THE RELATED ART

Currently there is no viable platform infrastructure of consolidated resources for growers to collect personalized agriculture monitoring for strategic crops growth, manage soil condition, pesticide control, fertilizer selection, crop selection, etc. There is no consolidated system to increase overall crop yield, nor well established communication platform to connect the growers to the market, nor any viable infrastructure for optimized management of food storage logistics and food distribution and food delivery to the marketplace and to the consumers.

SUMMARY OF THE INVENTION

In one embodiment of the present invention, this single system platform provides a solution to collect and monitor agriculture data in real time using IoT (Internet of Things) platform integrated with Artificial Intelligence to provide predictive data analytics to proactively trigger preventive actions automatically or remotely.

The other embodiment is to provide communication infrastructure system with social media platform for connecting growers to the marketplace and optimizing logistics of food storage and distribution and food delivery to the market. This integrated IoT system will increase crop yield, reduce water consumption, reduce waste during food storage and distribution and food security.

BRIEF DESCRIPTION OF THE DRAWINGS
(PLEASE SEE ENCLOSED DRAWING FILE)

FIG. 1 represents flowchart of how the data is collected from the field

FIG. 2 represents flowchart on how data is monitored

FIG. 3 represents flowchart of how the control system works

FIG. 4 provides communication infrastructure platform flow

DETAILED DESCRIPTION

Field System

The lifeline unit (see FIG. 1) comes with a microcontroller connected to sensor network that comprises of soil moisture probe, soil temperature probe, soil pH & salinity probe) embedded into the soil. Soil data is collected by soil moisture sensor which is radial probe with 2 electrodes, one down the center and one wraps around it. It's a resistance device that is embedded into the soil which comes to equilibrium with the soil moisture.

It is then measured resistance in the wires that's comes with the sensor indicates the soil moisture level or water content of the soil. The data from the sensor probe is sent to the attached microcontroller thru the wires that comes with the sensor.

The leaf wetness sensor measure LWD (leaf wetness duration) placed on the leaves at various location of the field also attached to the microcontroller.

The sensors are embedded at different depth of the soil and surrounding area connected to the microcontroller with WiFi module. The microcontroller with sensor probe is placed strategically to create a WiFi mesh network for optimum accurate data collection through WiFi over large distance. The sensors are marked using GPS. This allows ease of transfer of soil moisture and temperature data to the central computer at the base station or on the user smartphone for remote monitoring. Please refer to FIG. 1 flowchart.

The unit where the microcontroller is attached, it is extended upward to collect weather data, it is equipped with weather probe that collects humidity, temperature, wind speed, wind direction & rain fall. This unit also has built in artificial light system (grow light, electromagnetic spectrum to increase photo synthesis) that provides added illumination during rainy or cloudy days and after sunset. This unit is powered by solar panels attached to the top along with battery to give it 3.3V electricity.

The drip and sprayer system is strategically placed on the ground based on moisture data and crop type. The sprayer system can also spray fertilizer.

Use large Kite or UAV drone system with camera attached to remotely collect image from the field in real time to check the state of the crop over large area.

Monitor System

Using Microcontroller board and mesh WiFi data network systems (please see FIG. 2) data is collected from the lifeline unit is then transferred over to the central microcontroller board and WiFi shield at the base station or through cellular network, GPS on users smartphone.

The sensor module data is stored over cloud and data analytics with artificial intelligence software module is performed to visualize soil moisture data and soil moisture trend, soil temperature, soil pH (amount of nitrogen, salinity etc.) data to determine soil condition, leaf moisture data to determine leaf condition, the amount of dew duration that correlates to disease detection and soil moisture prediction based on historic weather data and moisture data.

Illumination data gathered is to determine the level of intensity used, weather data (air temp, humidity, wind speed, wind direction, rain fall, etc.) The kite (please refer to FIG. 2 of the drawing file) uploads image data automatically to cloud for visual analysis. The graphical pattern and trend analysis is done using AI (artificial intelligence) for predictive analytics to send trigger action message to the control system.

User has the option to auto send alert to their smart phone. User can login to their agriculture monitoring platform from anywhere in the world via the Internet.

Control System

The control system is comprised of drip and sprayer system. The artificial intelligence modeling of the monitored data determines prescriptive action and use of fuzzy logic input parameters to trigger action to the drip and sprayer system.

The drip and sprayer system helps in controlled irrigation and fertilization process The triggering mechanism can be programmed to turn on and off the illumination unit based on sunlight condition (data gathered from weather system) with option for adjusting the light intensity.

Users can issue command from their smartphone user interface to trigger flight to the kite or UAV system. Also, user has option to harness the power of satellite images, all of these options are given on the menu driven user application interface.

With leaf wetness data monitoring which gives information on disease detection will trigger amount of pesticide to be used by the sprayer assembly.

With the weather data and soil data monitoring, users are alerted optimum time to seed and varieties of seedlings recommendations for early seeding. It will also connect users with the companies providing seeds for planting and setup automatic seed order should users set it up accordingly.

Communication System

The communication system is comprised of Crop Selection & Mapping data, Market Connection, Seed Connection and Social Media Connection Crop Selection & Mapping Data User use the software which is equipped with options for personalization based on their location and soil condition and historical soil data that will provide recommendations on crop selection. This crop selection algorithm will be referenced to the central database from US agriculture department for the crop list based on the geographical region, climate and soil map data. It will provide suggestions on which crop to grow when, how to grow, etc.

Market Connection

This platform will connect the growers to the market and consumers to determine which crop are in demand based on predictive analytics and the market value for the crop.

Seed Connection

This system will connect growers to the breeders to get farmers input in better seed breeding and providing growers with high quality seed.

Social Media Connection

The growers can also connect to neighboring growers to exchange information, make deals on combined volume production for market supply, get advice on farming and a platform for flow of ease of information sharing.

Food Storage, Logistics, Distribution and Delivery

This platform provides logistics for farm produce storage and distribution to the market using Artificial Intelligence and IoT sensors and GPS (Global Positioning System) to track the flow real time. Farmers, distributors, market and consumers can monitor the location of farm produce delivery by using logistics tracking at any given moment using the user application interface.

The invention claimed is:

1. An integrated hardware and software IoT (Internet of Things) platform equipped with Artificial Intelligence where agricultural data is collected and monitored in real time remotely which provides predictive data analytics to proactively trigger preventive actions automatically:

This consolidated IoT platform provides real-time data on crop growth, soil condition, pesticide control, fertilizer selection, crop selection, crop yield, greenhouse, urban farm, garden & lawn output such as crop climate and weather data; this platform comprises:

A hardware portion that is called the Lifeline Unit, functions as a Field system, Monitor System, Control System and Communication System that provides a solution to collect and monitor agriculture data in real time; the field image data is collected using a kite guidance system, infrared imaging, satellite or UAV; Data is viewed on remote computers, laptop or handheld devices such as tablet or smartphone wherein data can be accessed both onsite or remotely;

The Field System comprises the Lifeline Unit, which is placed on the field equipped with a microcontroller board, which collects raw data from sensors that are embedded in the soil;

The platform uses embedded WiFi or LoRa (low power long range communication protocol) module on the Lifeline unit to send field data using the WiFi Mesh Network or LoRaWAN to a central hub (IoT gateway) where the data is processed for any actions based on algorithms that have been set;

The Monitor System comprises data that is sent in real time from the Lifeline Unit and it is processed at the IoT edge processing in the central hub (IoT gateway) then it is sent to a software interface for data storage and analytics namely cloud computing where data is sent in real time where users can access remotely;

The Control System comprises data analytics software that uses an artificial intelligence model for pattern recognition and alert the action module connected to the sprayer and drip irrigation system to take preventive actions such as watering when the soil is dry or engaging a kite guidance system or UAV (unmanned aerial vehicle) or infrared camera to take images of any drought condition in the field;

The Communication System comprises a communication and social media networking platform to connect growers to the market-place; It uses Lifeline Unit with WiFi mesh network and satellite GPS where crop mapping data is collected in real time that is sent to the cloud via the internet where a social network application platform is provided for growers to connect to the marketplace;

The Communication System also comprises logistics optimization for food storage, food tracking, distribution and food delivery to the marketplace; Data is collected via Asset Tracking Sensors, which has a built-in GPS module to send signals of the said crop (food) while in transit and is displayed in real time on the communication platform; The sensors are placed strategically on the delivery vehicles or on the cartons of the food bin; In addition, temperature and humidity sensors are placed in the food storage facility along the food delivery route to the marketplace to minimize spoilage and track inventory in real-time via the communication system;

The integrated IoT system flow consists of:

Field System, Monitoring System, Control System and Communication System; below is further details on each system:

Field System:

Lifeline Unit has a weather station with solar panels, the microcontroller boards are mounted onto the unit for sensor reading; the WiFi unit is connected to the unit for mesh network, grow LED lights are also mounted with a controller; This unit is then connected to a sensor module and the sensor module is embedded into the soil; the field system also has drip and spray irrigation system equipped with microcontroller board for automatic water dispensing based on the soil moisture data from the Lifeline Unit;

Monitoring System:

Field data is monitored in real-time via sensors in the soil and the weather sensors that are connected to the microcontroller board, it sends raw physical data to WiFi mesh network or LoRa (long range) WAN which uses a gateway hub network to consolidate field data and send it to cloud; It is then post processed to be viewed in a dashboard inside the software app downloaded in the smartphone;

Control System:

The control system field data and check against controlled parameters set in the data analytics in the software applications where Artificial intelligence modeling is used to mitigate preventive and predictive action;

The control valve gets triggered if the soil moisture data is below a moisture threshold set in the control parameter; The drip system microcontroller gets activated from the threshold data;

The microcontroller then sends a signal to the controller valve and water is sprayed through the drip irrigation system on the field, similarly, aerial data collection is triggered when large swaths of land show change in field data such as moisture level, yield loss, smoke detection; This activates the kite guidance system or drone to launch and bring back aerial footage for real-time viewing remotely; The control system also turns on LED grow lights and fans are turned on based on the control parameters such as: time of day and illumination data; The system also analyzes data for any preventive maintenance needed and sends alerts to equipment management team via SMS text message;

Communication System:

The communication system is a software application interface that can be viewed on any mobile device (laptop or tablet or smartphone) with remote access capability; Data analytics is run on this application where artificial intelligence modeling is applied on the field data to determine predictive maintenance and crop yield forecasting; The data is displayed in charts viewed in a dashboard for key insights;

Based on the predictive data, further actions are performed automatically using application programming interface (API), for example, seeds are automatically ordered to the seed company based on predictive data; It also connects farmers to the marketplace and other farmers in their local community to exchange seeds or share any information via instant messaging or video conferencing; The communication system also displays logistics and real-time tracking of the inventory on route to the marketplace;

Since this Lifeline Unit is mobile, it can be installed in remote locations where it is outfitted with various types of sensors that can be integrated to collect data for various applications and usage.

2. The said IoT system in claim 1 is applicable for Geotechnical soil survey, geotechnical investigations, mineral exploration, geotechnical drilling including various soil testing to remotely provide actionable data that prompt users to take actions.

3. The said integrated IoT system in claim 1 is applicable for air quality measurement data collection, greenhouse gas emission data collection and hazardous waste material detection to provide user remote monitoring capability and actionable data output.

4. The said integrated IoT system in claim 1 is further applicable for hydrocarbon detection in soil and seawater; the said integrated IoT system is applicable in oil drilling, monitoring pipelines and oil refinery management to provide remote monitoring with actionable results with a platform of integrated communications.

5. The said integrated IoT system platform in claim 1 is applicable in Fisheries and Aquaculture management.

6. The said integrated IoT system platform in claim 1 is further applicable in Semiconductor Fabrication Plant and Chemical Plant to monitor and provide actionable data to reduce equipment downtime and improve productivity.

7. The said integrated IoT system platform in claim 1 is further applicable in Oceanography, atmospheric and environmental monitoring for global warming to provide useful and actionable data.

8. The said integrated IoT system platform in claim 1 is also applicable to detect earthquake and tsunami where it sends smart alerts to mobile phones to minimize death and destruction.

9. The said integrated IoT system platform in claim 1 further covers monitoring old infrastructure such as: bridges, electric grid, dams, roads, tunnels, airports to determine structural integrity and maintenance ahead of time.

10. The said integrated IoT system platform in claim 1 further applicable use in building monitoring and factory management.

11. The said integrated IoT system platform in claim 1 further applicable in data center management.

12. The said integrated IoT system platform in claim 1 further applicable in inventory management and inventory tracking.

13. The said integrated IoT system platform in claim 1 further applicable in logistics and supply chain management.

\* \* \* \* \*